March 18, 1969     W. KLEINSTÜCK ET AL     3,433,019
HYDRAULIC BRAKE SYSTEMS FOR MOTOR VEHICLES
Filed Dec. 12, 1966
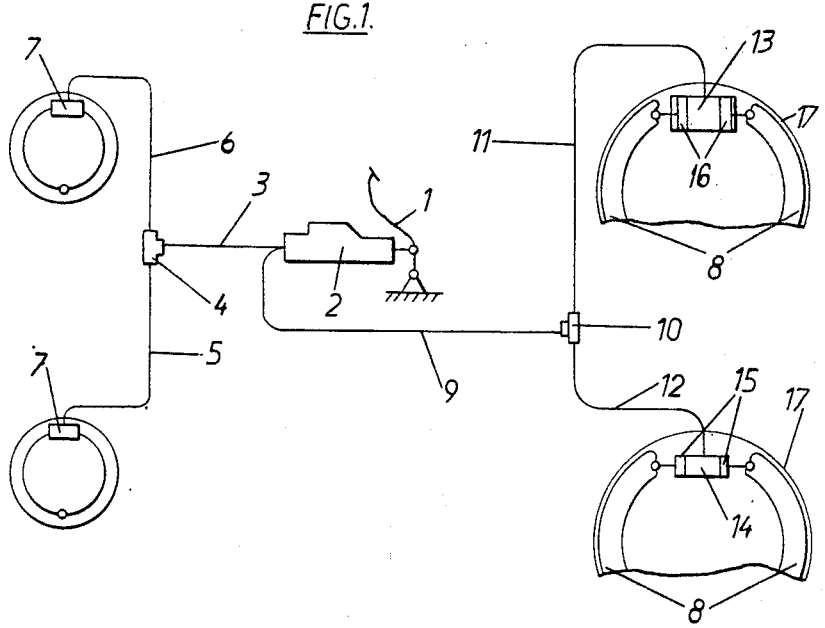
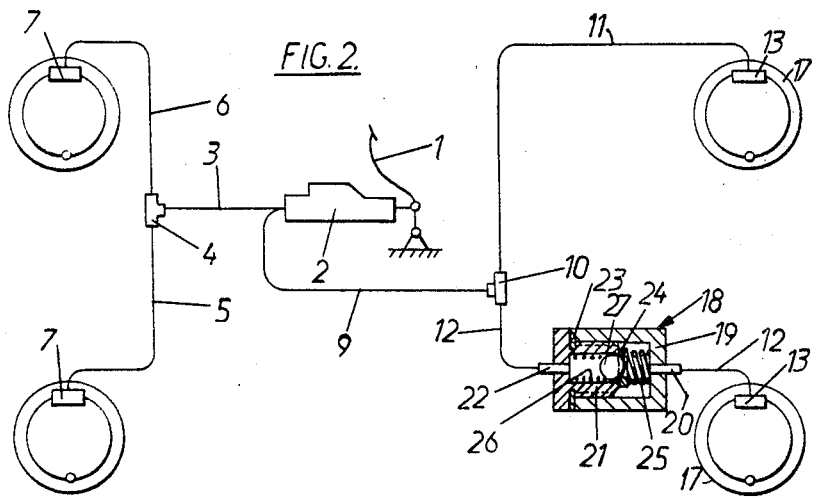
Inventors
Werner Kleinstück
& Klaus Heger
BY D. D. McGraw
Attorney

United States Patent Office 3,433,019
Patented Mar. 18, 1969

3,433,019
HYDRAULIC BRAKE SYSTEMS FOR
MOTOR VEHICLES
Werner Kleinstück, Russelsheim-Hassloch, and Klaus Heger, Bischofsheim, Germany, assignors to General Motors Corporation, Detroit, Mich., a corporation of Delaware
Filed Dec. 12, 1966, Ser. No. 600,804
Claims priority, application Germany, Dec. 21, 1965, O 11,339
U.S. Cl. 60—54.5    6 Claims
Int. Cl. F15b 7/00; F16d 65/32

This invention relates to hydraulic brake systems for motor vehicles.

In a hydraulic brake system according to the invention, for the purpose of reducing the likelihood of a rear pair of wheels locking during braking, provision is made for producing unequal braking forces at the two rear wheels during at least a part of a braking operation.

The appended claims define the scope of the invention claimed. The invention and how it can be performed are hereinafter particularly described with reference to the accompanying drawing, in which:

FIGURE 1 schematically illustrates the lay-out of a first embodiment of a hydraulic brake system according to the invention in a motor vehicle; and FIGURE 2 schematically illustrates the lay-out of a second embodiment of a hydraulic brake system according to the invention in a motor vehicle. Like reference numerals are used for like parts in FIGURES 1 and 2.

In the embodiment shown in FIGURE 1, a brake pedal 1 is arranged to actuate a brake master cylinder 2. Pipes 3, 5, 6 and a distributor 4 connect the brake master cylinder to a pair of wheel brake cylinders 7 for the front wheels of the vehicle, and pipes 9, 11, 12 and a distributor 10 connect the master cylinder to a pair of wheel brake cylinders 13 and 14 for the rear wheels of the vehicle. The wheel brake cylinders 7 for the front wheels are identical, whereas the wheel brake cylinders 13 and 14 for the rear wheels have different diameters.

Depression of the brake pedal 1 causes hydraulic pressure to be transmitted from the master cylinder 2 to the wheel brake cylinders; pistons 15 and 16 of the rear wheel brake cylinders thereby impart a braking force to the respective brake shoes 8 of the rear wheels. At a given hydraulic pressure, the force with which a brake shoe is applied against the brake drum 17 is dependent upon the area of the respective piston, and thus upon the effective cross-sectional area of the respective wheel brake cylinder. The ratio and magnitudes of the areas of the pistons 15 and 16 are so adjusted with respect to the vehicle and the entire system that the rear wheel with the larger-diameter cylinder 16 locks before the front wheels, whereas the rear wheel with the smaller-diameter cylinder 14 locks after the front wheels.

Alternatively, the rear wheel brake cylinders could be identical, in which case a similar result could be obtained by interposing a cut-off valve or pressure-reducing valve in the pipe 12 leading to one of the rear wheels. A cut-off valve (not shown) would shut off a wheel cylinder from the remainder of the brake system as soon as the braking pressure exceeded a design value; a pressure-reducing valve (not shown) would diminish the pressure in one of the wheel cylinders to a fraction of the pressure in the remainder of the brake system.

In the embodiment shown in FIGURE 2, a spring-loaded check valve 18 is interposed in the pipe 12. This valve 18 consists of a thimble-shaped casing 19 with an outlet aperture 20 leading to a part of the pipe 12 joined to the rear wheel brake cylinder 13. A threaded plug 21 having an inlet aperture 22 is screwed into the casing 19, with the interposition of a sealing gasket 23. An annular valve seat 24 is located inside the valve casing 19 and is resiliently held in sealing engagement with a shoulder formed by the inner end of the threaded plug 21 by means of a compression spring 25 seated inside one end of the casing 19. Inside the threaded plug 21 there is a weaker spring 26 which resiliently holds a ball 27 in a fluid-tight manner against the annular valve seat 24. The diameter of the ball 27 is less than the internal diameter of the plug 21, to allow an adequate flow cross-section. On slippery road surfaces, namely when there is an increased risk of skidding, the driver brakes carefully, and the resulting braking pressure is not sufficient to open the valve 18 against the force of the compression spring 25. If the braking pressure exceeds a design value, the annular valve seat 24 is moved by the ball 27 away from the inner end of the plug 21, in opposition to the action of the compression spring 25, and thereby establishes communication between the two apertures 22 and 20. Thereupon, the wheel brake cylinder 13 is supplied with the full pressure of the brake system.

In this embodiment, one of the rear wheels is not braked at all on slippery roads, on which only low brake pressures are used. This wheel therefore retains its lateral guiding action, so contributing to stability of the vehicle. On good road surfaces, however, on which high braking pressures are used, both rear wheels are braked equally.

We claim:

1. A hydraulic brake system for front and rear pairs of wheels of a motor vehicle, said system comprising:
    a brake master cylinder having means for causing said master cylinder to produce hydraulic pressure;
    front and rear pairs of brakes respectively associated with said front and rear pairs of wheels, each of said brakes including a wheel cylinder for converting hydraulic pressure produced by said master cylinder into brake actuating force for braking the wheel associated therewith;
    first conduit means hydraulically connecting said master cylinder and the wheel cylinders of one of said pairs of brakes and the wheel cylinder of one brake of the other of said pairs of brakes;
    second conduit means hydraulically connecting said master cylinder and the wheel cylinder of the other brake of the other of said pairs of brakes; and
    hydraulic pressure modifying means in said second conduit means only hydraulically intermediate said master cylinder and the wheel cylinder of said other brake, said modifying means including a valve responsive to hydraulic pressure produced by said master cylinder to limit the brake actuating force of the other brake to a lesser amount relative to the brake actuating force of the one brake during at least a part of a brake actuating cycle.

2. The hydraulic brake system of claim 1 in which said valve is a cut-off valve effective to hydraulically shut off said other wheel cylinder from said master cylinder until the hydraulic pressure produced by said master cylinder exceeds a design value.

3. The hydraulic brake system of claim 2 in which said cut-off valve is a spring-loaded check valve.

4. The hydraulic brake system of claim 3 in which said spring-loaded check valve comprises:
    a casing having inlet and outlet apertures and a shoulder therein intermediate said apertures,
    an annular valve seat spring-loaded into sealing engagement with said shoulder, and
    a valve ball spring-loaded in fluid-tight sealing engagement against said valve seat and movable by hydraulic pressure from said inlet aperture to move said valve seat out of engagement with said shoulder to establish hydraulic connection between said master cylinder and said other wheel cylinder.

5. The hydraulic brake system of claim 1 in which said valve is a pressure reducing valve effective to diminish the hydraulic pressure delivered to said other brake to a fraction of the hydraulic pressure produced by said master cylinder.

6. The hydraulic brake system of claim 1 in which said first conduit means connects said master cylinder and those brakes associated with the front vehicle wheels and one of the rear vehicle wheels, and said second conduit means connects said master cylinder and the brake of the other of the rear vehicle wheels.

References Cited

UNITED STATES PATENTS

| | | |
|---|---|---|
| 2,131,459 | 9/1938 | Weatherhead. |
| 2,144,020 | 1/1939 | Hunt. |
| 2,216,847 | 10/1940 | Loweke. |
| 2,219,765 | 10/1940 | Chase. |
| 2,355,026 | 8/1944 | Koppen. |
| 2,442,601 | 6/1948 | House et al. |
| 2,616,658 | 11/1952 | Dombeck. |
| 3,311,422 | 3/1967 | Oberthür. |

FOREIGN PATENTS

| | | |
|---|---|---|
| 461,745 | 2/1937 | Great Britain. |
| 491,149 | 8/1938 | Great Britain. |

MARTIN P. SCHWADRON, *Primary Examiner.*

R. R. BUNEVICH, *Assistant Examiner.*

U.S. Cl. X.R.

188—152; 303—6; 317—234; 307—88.5; 29—155.5